E. D. WESTRIP.
VARIABLE SPEED GEARING.
APPLICATION FILED AUG. 20, 1909.
965,971.
Patented Aug. 2, 1910.
3 SHEETS—SHEET 1.
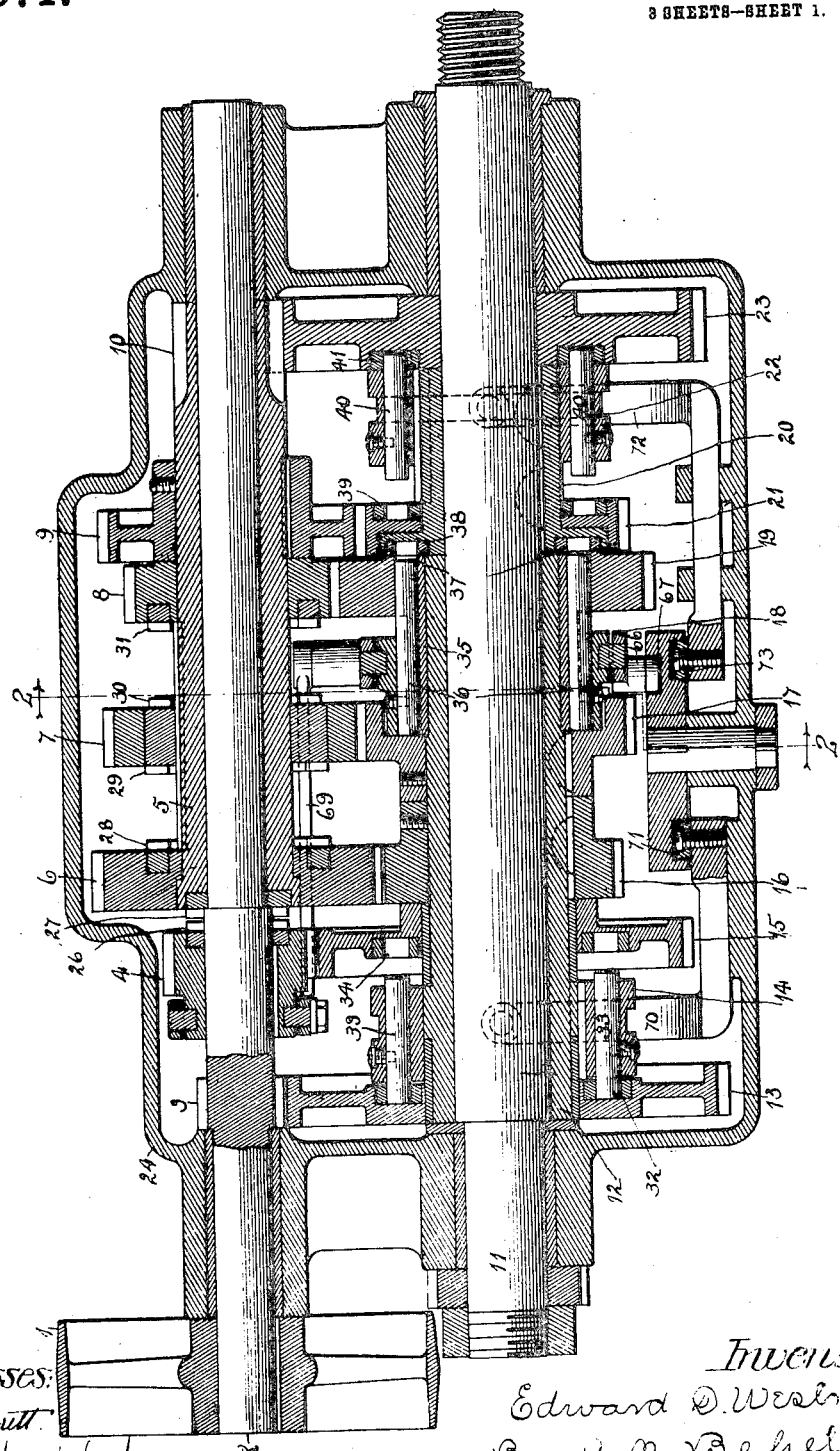
Witnesses:
N. H. Barrett
Gladys Ward
Inventor:
Edward D. Westrip
By A. O. Behel
Atty.

E. D. WESTRIP.
VARIABLE SPEED GEARING.
APPLICATION FILED AUG. 20, 1909.
965,971.
Patented Aug. 2, 1910.
3 SHEETS—SHEET 2.
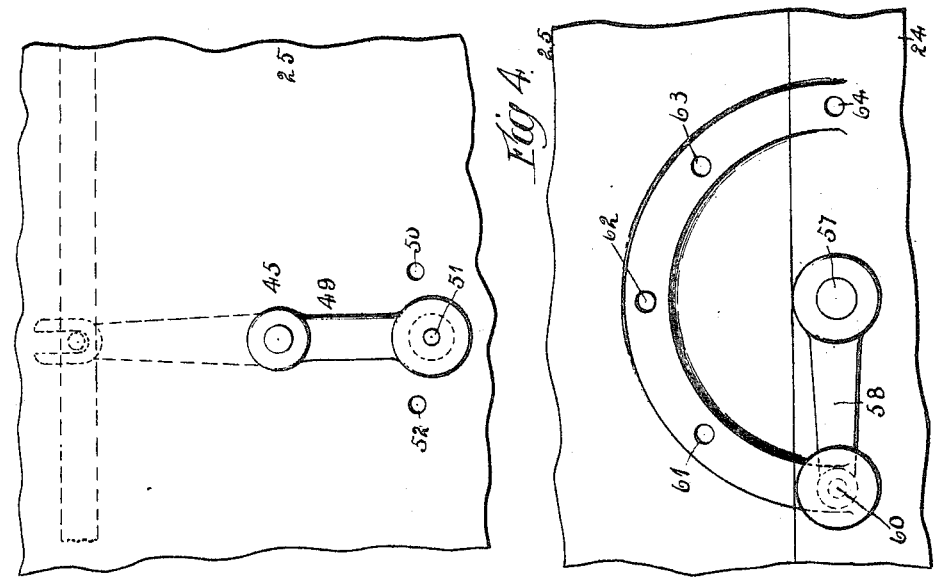
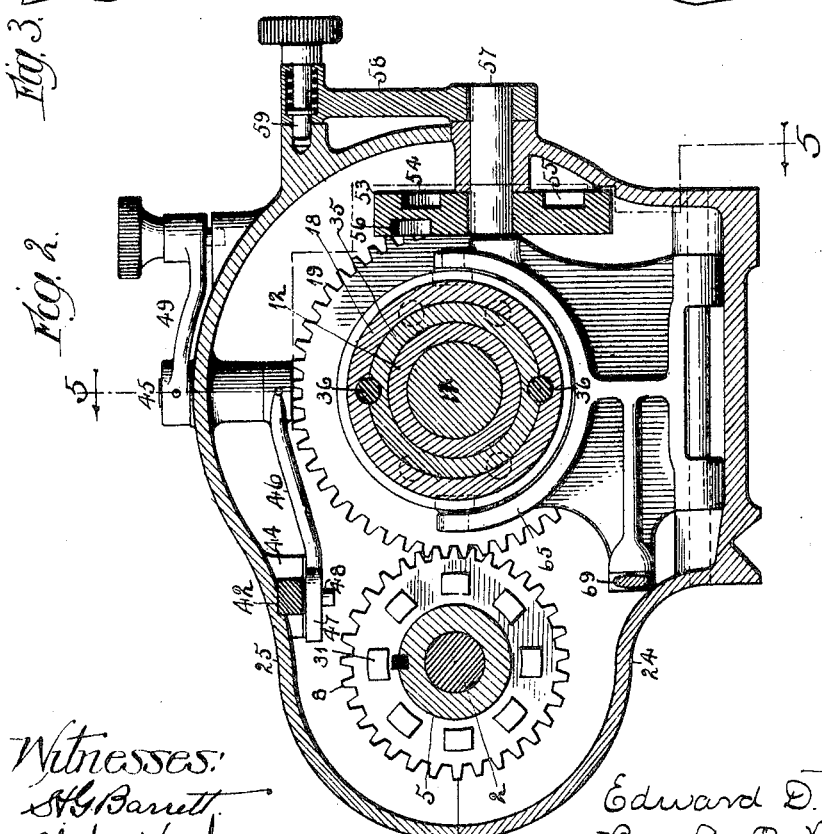
Witnesses:
H. G. Barrett
Gladys Ward
Inventor:
Edward D. Westrip
By A. O. Behel
Atty.

E. D. WESTRIP.
VARIABLE SPEED GEARING.
APPLICATION FILED AUG. 20, 1909.
965,971.
Patented Aug. 2, 1910.
3 SHEETS—SHEET 3.
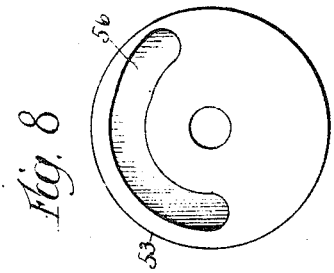
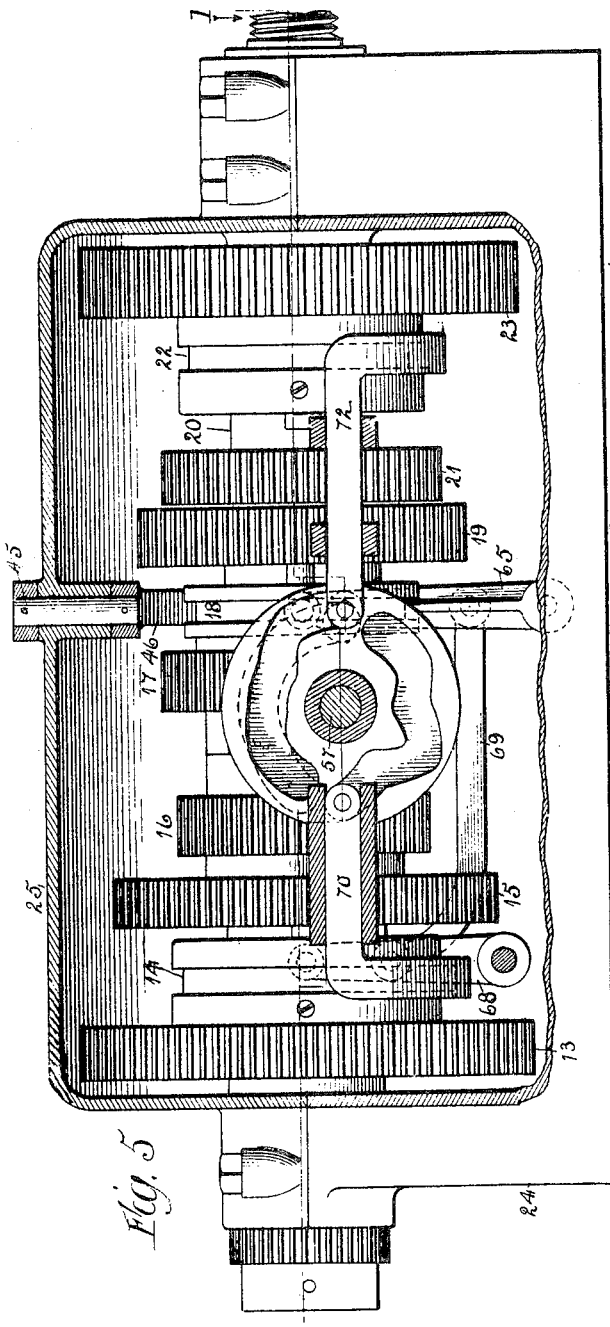
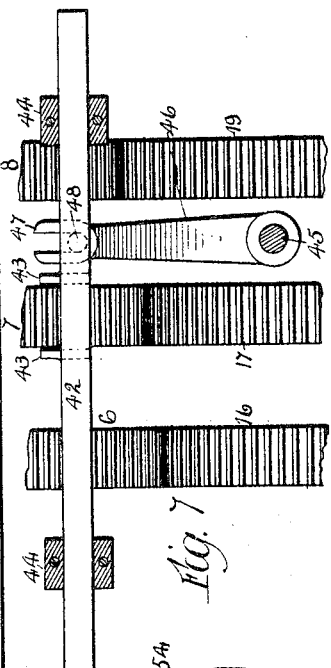
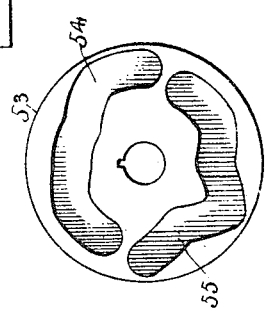
Witnesses:
Inventor:
Edward D. Westrip
By A. J. Behel
Atty.

UNITED STATES PATENT OFFICE.

EDWARD D. WESTRIP, OF ROCKFORD, ILLINOIS.

VARIABLE-SPEED GEARING.

965,971.  Specification of Letters Patent.  Patented Aug. 2, 1910.

Application filed August 20, 1909. Serial No. 513,894.

*To all whom it may concern:*

Be it known that I, EDWARD D. WESTRIP, a citizen of the United States, residing at Rockford, in the county of Winnebago and State of Illinois, have invented certain new and useful Improvements in Variable-Speed Gearing, of which the following is a specification.

The object of this invention is to impart variable speeds to a driven shaft from a driving shaft by the employment of the least number of gears for the greatest number of speeds.

In the accompanying drawings, Figure 1 is a horizontal lengthwise section, the driving and driven shafts not sectioned. Fig. 2 is a transverse section on dotted line 2 2 Fig. 1. Fig. 3 is a plan view of the shipping lever 48. Fig. 4 is an elevation of the cam lever 58. Fig. 5 is a vertical section on dotted line 5 5 Fig. 2. Fig. 6 is an outer face view of the cam 53. Fig. 7 is a plan view of the fork 46. Fig. 8 is an inner face view of the cam 53.

The casing is in two sections 24 and 25, the lower section 24 supporting the driving shaft 2, and driven shaft 11, the upper section forming a cap in order that the gearing and clutches within the casing may be run in oil.

The driving shaft is rotated by a belt turning the pulley 1. A spur pinion 3 is fixedly connected to the shaft 2, and a gear 4 has a sliding engagement with this shaft, and is provided with a clutch face 26. A sleeve 5 is loosely mounted on the shaft 2 and is provided with a clutch face 27 with which the clutch face 26 may engage. A spur gear 6 is mounted to turn loosely on the sleeve 5 and has a clutch face 28. A spur gear 7 has a sliding engagement with the sleeve 5 and has clutch faces 29 and 30. A spur gear 8 is mounted to turn loosely on the sleeve 5 and has a clutch face 31. The clutch face 29 of the spur gear 7 is fitted to engage the clutch face 28 of the spur gear 6, and the clutch face 30 of the spur gear 7 is fitted to engage the clutch face 31 of the spur gear 8. A spur gear 9 is fixedly connected to the sleeve 5, and a spur pinion 10 is a part of this sleeve. A sleeve 12 is loosely mounted on the driven shaft 11, a spur gear 13 is mounted to turn loosely on the sleeve 12, and has a clutch face 32. A clutch section 14 has a sliding engagement with the sleeve 12 and has the pins 33 projecting from each face. A spur gear 15 is mounted to turn loosely on the sleeve 12 and has a clutch face 34. The pins 33 are adapted to engage with the clutch face 32 of the spur gear 13, or the clutch face 34 of the spur gear 15. Spur pinions 16 and 17 are fixedly connected with the sleeve 12. A spur gear 19 is fixedly connected to the sleeve 12 and has a hub extension 35. A clutch section 18 has a sliding engagement with the hub extension 35, and has pins 36 fixedly connected to it. These pins are located in holes 37 in the spur gear 19. A sleeve 20 is keyed to the driven shaft 11, and has a clutch face 38 with which the pins 36 may engage. A spur gear 21 is mounted to turn loosely on the sleeve 20, and has a clutch face 39, which engages with pins 40. A clutch section 22 has a sliding engagement with the sleeve 20 and supports pins 40 which extend from both faces. A spur gear 23 is mounted loosely on the driven shaft 11, and has a clutch face 41 with which the pins 40 may engage.

The gears 3 and 13 mesh; gears 4 and 15 mesh; gears 6 and 16 mesh; gears 7 and 17 mesh; gears 8 and 19 mesh; gears 9 and 21 mesh; and gears 10 and 23 mesh. When gear 7 is clutched with either of the gears 6 or 8, it will slide free of the gear 17. This gear 7 is moved by the bar 42 having depending projections 43 embracing the faces of the gear. This bar is guided in guideways 44.

A rod 45 is supported by the upper section of the casing to the lower end of which is secured an arm 46 having a forked end 47 receiving a stud 48 extending from the under face of the bar 42. To the upper end of this rod is secured a shipping lever 49 which is adapted to be located in the three holes 50, 51 and 52 formed in the upper section of the casing. When the shipping lever is moved into the hole 50, the clutch face 29 of the gear 7 will be in engagement with the clutch face 28 of the gear 6, when the shipping lever is moved into the hole 51 the gear 7 will be in mesh with the gear 17, and when the shipping lever is in the hole 52, the clutch face 30 of the gear 7 will be in engagement with the clutch face 31 of the gear 8.

A cam 53 has one face formed with the cam grooves 54 and 55, and its outer face formed with a cam groove 56. This cam is connected to a stud 57 which is supported in the lower section of the casing and to its projecting end is connected a cam lever 58 which supports a stud 59 adapted to be located in the holes 60, 61, 62, 63 and 64. By moving the cam lever 58, the cam 53 is oscillated and held in any of its adjusted positions.

To the lower section of the casing is pivoted a fork 65 which engages the clutch section 18 and by which this clutch section is moved. From this fork 65 extends a stud 66, supporting a roller 67 which is located in the cam groove 56. A fork 68 is fitted to the lower section of the casing and embraces the gear 4. A link 69 connects forks 65 and 68. When the cam 53 is oscillated the clutch section 18 and gear 4 will be moved. A fork 70 has a connection with the clutch section 14 and also supports a roller 71 which is located in the cam groove 55. A fork 72 has a connection with the clutch section 22, and also supports a roller 73 located in the cam groove 54. By oscillating the cam 53, the clutch sections will be moved.

The different speeds will now be traced which are accomplished by means of the shipping lever 49 and cam lever 58.

When the cam lever 58 is in the hole 60, and the shipping lever 49 is in the hole 50, the connection between the driving shaft 2 and driven shaft 11 will be through the parts designated by the numerals 2, 3, 13, 14, 12, 16, 6, 7, 5, 10, 23, 22, 20 and 11. By moving the shipping lever 49 into the hole 51, the connection will be through the parts 2, 3, 13, 14, 12, 17, 7, 5, 10, 23, 22, 20 and 11. By moving the shipping lever 49 into the hole 52, the connection will be through the parts 2, 3, 13, 14, 12, 19, 8, 7, 5, 10, 23, 22, 20 and 11. Moving the cam lever 58 into the hole 61, and the shipping lever 49 into the hole 50, the connection will be through the parts 2, 4, 15, 14, 12, 16, 6, 7, 5, 10, 23, 22, 20 and 11. By moving the shipping lever 49 into the hole 51, the connection will be through the parts 2, 4, 15, 14, 12, 17, 7, 5, 10, 23, 22, 20 and 11. By moving the shipping lever 49 into the hole 52, the connection will be through the parts 2, 4, 15, 14, 12, 19, 8, 7, 5, 10, 23, 22, 20 and 11. By moving the cam lever 58 into the hole 62, and the shipping lever 49 into the hole 50, the connection will be through the parts 2, 3, 13, 14, 12, 16, 6, 7, 5, 9, 21, 22, 20 and 11. By moving the shipping lever 49 into the hole 51, the connection will be through the parts 2, 3, 13, 14, 12, 17, 7, 5, 9, 21, 22, 20 and 11. By moving the shipping lever 49 into the hole 52, the connection will be through the parts 2, 3, 13, 14, 12, 19, 8, 7, 5, 9, 21, 22, 20 and 11. Moving the cam lever 58, into the hole 63, and the shipping lever 49 into the hole 50, the connection will be through the parts 2, 4, 15, 14, 12, 16, 6, 7, 5, 9, 21, 22, 20 and 11. By moving the shipping lever 49, into the hole 51, the connection will be through the parts 2, 4, 15, 14, 12, 17, 7, 5, 9, 21, 22, 20 and 11. By moving the shipping lever 49 into the hole 52 the connection will be through the parts 2, 4, 15, 14, 12, 19, 8, 7, 5, 9, 21, 22, 20 and 11. Moving the cam lever 58 into the hole 64, and the shipping lever 49 into the hole 52, the connection will be through the parts 2, 4, 5, 7, 8, 19, 18, 20 and 11. By moving the shipping lever 49 into the hole 51, the connection will be through the parts 2, 4, 5, 7, 17, 12, 18, 20 and 11. By moving the shipping lever 49, into the hole 50, the connection will be through the parts 2, 4, 5, 7, 6, 16, 12, 18, 20 and 11.

By this arrangement of gears and clutches, fifteen speeds are obtained by the employment of fourteen gears, and by the employment of two shafts, the driver and driven.

I claim as my invention.

1. In a variable speed gearing, the combination with rotary driving and driven members, of gear connections between the members, a rotatable plate having a plurality of cam grooves in its opposite side faces, clutches for connecting and disconnecting certain gears and the members, and clutch operating devices having portions engaged in the cam grooves.

2. In a variable speed gearing, the combination with a casing, of driving and driven shafts journaled therein, a spindle journaled in the casing at right angles to the shaft, a plate fixed on the inner end of the spindle and having cam grooves in its side faces, a lever mounted on the outer end of the spindle, means carried by the casing for engaging the lever to hold it in different positions, a plurality of sets of gears for connecting the shafts, clutches for the gears, and clutch operating devices having portions engaged in the cam grooves.

3. In a variable speed gearing, the combination with driving and driven members, of a sleeve, a plurality of sets of gears connecting the sleeve and one of the members, another set of gears connecting the driving and driven members independently of the sleeve, means for clutching said latter set and also the sleeve with one of the members, and clutches for the sets of gears that are connected to said sleeve.

4. In a variable speed gearing, the combination with driving and driven shafts, of a sleeve journaled on one of the shafts, a set of gears for connecting the shafts independently of the sleeve, means for clutching the gears or the sleeve to one of the shafts, a plurality of sets of gears connecting the sleeve and the other shaft, and clutches for said latter sets of gears.

5. In a variable speed gearing, the combination with driving and driven shafts, of a sleeve journaled on one of the shafts, spaced gears loose on the sleeve and geared to the other shaft, a gear connected to said other shaft, another gear slidable on the sleeve into and out of clutching engagement with the first gears on said sleeve and also into and out of mesh with the gear on the other shaft, and means for clutching the sleeve to the shaft on which said sleeve is journaled.

6. In a variable speed gearing, the combination with driving and driven shafts, of a sleeve journaled on one of the shafts, a set of gearing connecting the shafts independently of the sleeves, means for clutching the sleeve to the shaft on which it is mounted, spaced gears journaled on the sleeve and geared to the other shaft, a third gear on said other shaft, another gear slidable on the sleeve into and out of clutching engagement with the gears that are loosely journaled on said sleeve and also being slidable into and out of mesh with the third gear, and means for sliding said gear.

7. In a variable speed gearing, the combination with a power-transmitting shaft member, of a sleeve journaled on said shaft member, gears journaled on the sleeve, means for clutching the sleeve to the shaft, means for clutching the gears to the sleeve, another power-transmitting member, and gears mounted on the latter power transmitting member and meshing with the various gears on the sleeve.

8. In a variable speed gearing, the combination with a power-transmitting shaft, of a collar fixed thereto, a gear journaled on the shaft, means for clutching together the collar and gear, a sleeve journaled on the shaft, a plurality of gears mounted on the sleeve, means for clutching the collar and sleeve together, a plurality of gears meshing with the said gears of the sleeve, and means for connecting a power-transmitting member to the last mentioned gears.

9. In a variable speed gearing, the combination with a power-transmitting shaft, of a collar fixed thereto, a gear journaled on the shaft, a gear journaled on the collar, means for clutching together the collar and gear journaled on the shaft and for clutching together the collar and the gear journaled on said collar, a sleeve journaled on the shaft, a plurality of gears mounted on the sleeve, means for clutching the collar and sleeve together, a plurality of gears meshing with the various above mentioned gears, and means for connecting a power transmitting member to the last mentioned gears.

10. In a variable speed gearing, the combination with a first and a second power transmitting shaft, of a sleeve journaled on the first power-transmitting shaft, means for clutching the sleeve to the shaft, spaced gears journaled on the sleeve, a sliding gear mounted on the sleeve and movable into clutching engagement with the first gears, a collar fixed to the second power transmitting shaft, a sleeve journaled on said second power transmitting shaft, gears fixed to the sleeve and meshing with certain of the gears on the sleeve of the first power-transmitting shaft, another gear loosely journaled on the sleeve of the second power-transmitting shaft and meshing with one of the loose gears on the sleeve of the first transmitting shaft, and means for clutching said latter gear to the sleeve of the second power transmitting shaft and for clutching the sleeve to the collar.

11. In a variable speed gearing, the combination of a driving shaft 2, a sleeve 5 loosely mounted on the shaft and having a clutch face, a gear 3 which rotates with the shaft, a combined gear and clutch 4 slidably connected with the shaft, a gear 9 fixedly connected with the sleeve 5, gears 6 and 8 loosely mounted on the sleeve and having a clutch face, a gear 7 slidably connected with the sleeve and both faces formed with clutch sections, means for moving the gears 4 and 7, driven shaft 11, a sleeve 12 loosely mounted on this shaft, gears 13 and 15 loosely mounted on the sleeve 12 and each provided with a clutch face, a double faced clutch section 14 slidably mounted on the sleeve 12, gears 16 and 17 fixedly connected with the sleeve 12, a gear 19 fixedly connected to the sleeve 12 and having an extended hub, a clutch section 18 slidably connected with the gear 19, a sleeve 20 fixedly connected to the driven shaft 11 and having a clutch face, a gear loosely mounted on the sleeve 20 and having a clutch face, a double clutch 22 slidably mounted on the sleeve 20, a gear loosely mounted on the shaft 11, the gears 3 and 13 being in mesh, gears 4 and 15 in mesh, gears 6 and 16 in mesh, gear 7 adapted to mesh with gear 17, gears 8 and 19 in mesh, gears 9 and 21 in mesh, gears 10 and 23 in mesh, and means for moving the clutch sections.

In testimony whereof I have hereunto set my hand in presence of two subscribing witnesses.

EDWARD D. WESTRIP.

Witnesses:
A. O. BEHEL,
E. D. E. N. BEHEL.